United States Patent
Cobarg

[15] 3,665,703
[45] May 30, 1972

[54] MEASURING AND INDICATING ARRANGEMENT

[72] Inventor: Claus Christian Cobarg, Steinbach/Ts, Germany

[73] Assignee: Braun Aktiengesellschaft, Frankfurt/Main, Germany

[22] Filed: Mar. 9, 1971

[21] Appl. No.: 122,451

Related U.S. Application Data

[63] Continuation-in-part of Ser. No. 781,935, Dec. 6, 1968, Pat. No. 3,591,957.

[30] Foreign Application Priority Data

Dec. 8, 1967 Germany ..................... P 15 91 859.9

[52] U.S. Cl. ..................... 58/152 H, 58/23 BA, 324/29.5
[51] Int. Cl. ..................... G04b 47/06, G04c 3/00
[58] Field of Search ............... 58/19, 23 R, 23 BA, 39.5, 152, 58/152 F, 152 H; 324/29.5

[56] References Cited

UNITED STATES PATENTS 2,972,107 2/1961 Criswell ..................... 58/39.5
3,243,795 3/1966 O'Brien ..................... 58/23

Primary Examiner—Richard B. Wilkinson
Assistant Examiner—Edith C. Simmons
Attorney—Michael S. Striker

[57] ABSTRACT

An arrangement for measuring the voltage of a battery to determine the state of charge of the battery when used to operate electrical timepieces. A pair of momentary contact switches are actuated by the hours wheel of the clock mechanism on the one hand, and by either the minutes wheel or the seconds wheel of the clock mechanism on the other hand, and when actuated in coincidence complete an electrical circuit which connects the battery with a voltage measuring instrument. An indicating device associated with the instrument indicates the measurement taken and is held in place by a holding device, after the measurement has been completed. The indicating device becomes released and permitted to turn to its initial position prior to the instant when a subsequent measurement is to be taken.

10 Claims, 1 Drawing Figure

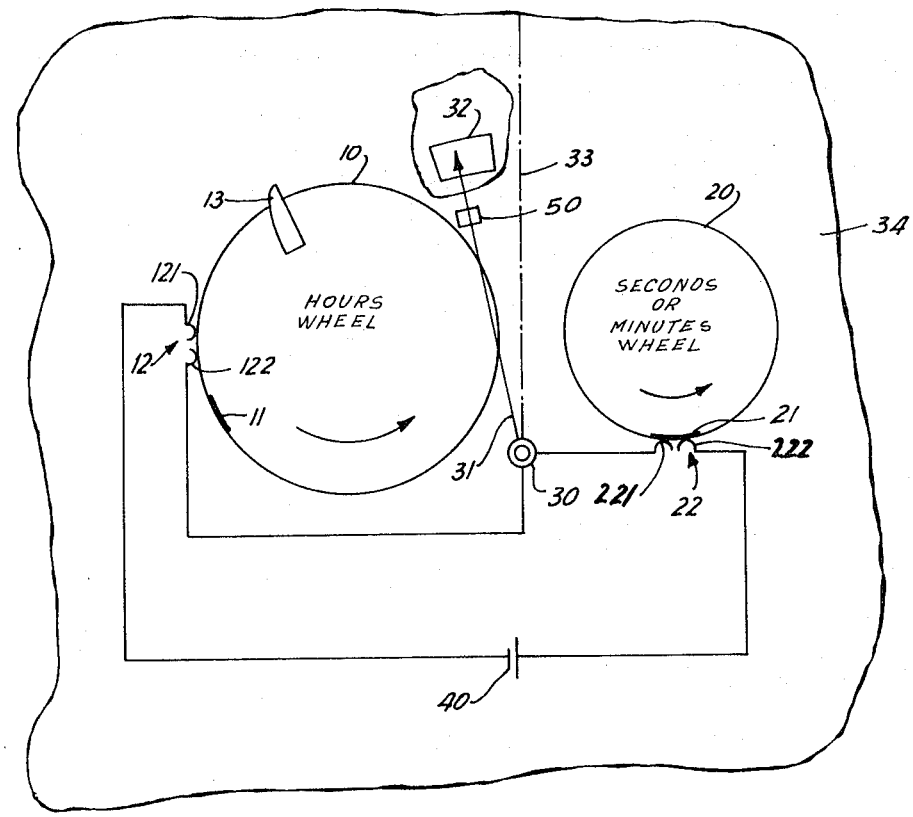

MEASURING AND INDICATING ARRANGEMENT

CROSS REFERENCE TO RELATED APPLICATIONS

The present application is a continuation-in-part of my currently copending application, Ser. No. 781,935, filed on Dec. 6, 1968, under the title "Voltage Measuring and Indicating Arrangement" now U.S. Pat. No. 3,591,957.

BACKGROUND OF THE INVENTION

The present invention relates to an arrangement for automatically measuring and indicating voltages associated with electrically operated apparatus, and more particularly with electrically operated time pieces such as watches or clocks.

With the popularity of electrically operated clocks or watches steadily increasing, it is desirable to be able to determine the charged state of the battery which actuates the clockwork, so that the battery may be replaced prior to the time at which the timepiece stops due to discharge of the battery beyond a predetermined minimum state. For the most part such timepieces have a very low energy requirement and can operate satisfactorily for relatively long periods of time with the energy supplied by a single battery. Compensating devices are frequently provided which compensate for small inaccuracies resulting from progressing discharge of the battery, so that significant inaccuracies in time-keeping due to the progressing discharge of the battery are usually only observed when the battery voltage has dropped to a predetermined minimum value where the voltage supply is no longer adequate for properly operating the clockwork. It is evidently desirable, of course, to be able to determine the approaching replacement point, that is the point at which the voltage supplied by the battery becomes inadequate, so that the battery may be replaced before this point is reached and serious inaccuracies in time indication take place.

The problem has of course already been recognized and an attempt has been made at providing a solution, in that a voltage measuring device or a glow lamp have been provided which may be connected to the battery through manual operation of a pushbutton. This type of arrangement, however, has certain disadvantages. Firstly, operation of the pushbutton will frequently be forgotten and may be completely omitted if for lengthy periods of time during which the voltage of the battery may drop to the point where it should be replaced. If the timepiece is a wallclock then it is frequently impossible or at the very least inconvenient to obtain access to the timepiece for operation of the pushbutton. Furthermore, and especially if a glow lamp is used, the energy consumed by the energized glow lamp is relatively significant before the lamp will provide an indication and the usually rather small battery — for instance as used in a watch — is discharged more by the testing step involving energization of the glow lamp then it is if the watch were permitted to continue operation without this testing step. Moreover, because the voltage required by the glow lamp is substantially higher than that required by a watch for still proper operation of the timepiece, the fact that the glow lamp will not become energized when the pushbutton is actuated does not necessarily mean that the battery has already reached the point where it must be replaced for assuring satisfactory operation of the timepiece. Finally, there is also the possibility that manual determination — e.g. by activating the pushbutton — is carried out too frequently so that the battery is drained more rapidly than would otherwise be the case.

My aforementioned copending application provides one solution to these problems, in that it provides for a measuring device which is connectable with the source of electrical energy, e.g. the battery, for measuring a parameter of the source, namely the voltage thereof. Momentary contact means is provided for connecting momentarily the source of electrical energy to the measuring device at predetermined time intervals and clock means is operated by the battery and actuates the momentary contact means. Indicating means is associated with the measuring means for indicating the measurement taken by the measuring means, and holding means holds the indicating means at the measurement taken after disconnecting the source of electrical energy from the measuring means by the momentary contact means. According to my prior application the control of the momentary contact means is carried out by the hours wheel of the clock means which opens and closes a switch at the aforementioned predetermined time intervals. This is a substantial improvement over the prior art.

However, it is desirable to obtain a still more precise control of the operation of the momentary contact means, than that obtainable with the invention set forth in my aforementioned application.

SUMMARY OF THE INVENTION

It is, accordingly, an object of the present invention to provide a still further improved measuring and indicating arrangement of the type under discussion.

More particularly, it is an object of the present invention to provide a measuring and indicating arrangement of the type under discussion which provides improved control of the momentary contact means.

A concomitant object of the invention is to provide such an improved measuring and indicating arrangement which automatically measures the voltage of the battery at predetermined regular time intervals, and which will provide a read-out of the measurement taken for prolonged periods of time, without requiring an undue drain on the battery either during the taking of the measurement or subsequent thereto.

In pursuance of the above objects, and others which will become apparent hereafter, one feature of the invention resides in a measuring and indicating arrangement which, briefly stated, comprises in one embodiment a source of electrical energy of which a parameter is to be measured and measuring means connectable to the source for measuring the parameter. Clock means is operated by the source and includes a clockwork and a first and a second switch which are actuated by the clockwork at predetermined time intervals in coincidence and which complete, when so actuated, an electric circuit connecting the source and the measuring means. Finally, I provide indicating means which is associated with the measuring means for indicating the measurement taken by the latter.

The first and second switches are connected in series and preferably one of them is actuated by the hours wheel of the clockwork, whereas the other is actuated either by the seconds wheel or by the minutes wheel. I currently prefer that the other or second switch be actuated by the seconds wheel, but there is nothing to preclude a different combination, including the possible combination of one switch being actuated by the minutes wheel and the other switch being actuated by the seconds wheel. In any case, when the two switches become simultaneously closed at a predetermined instant of time, a coincidence circuit is established through the two switches to thereby complete a closed circuit between the voltage source to be measured and the measuring instrument.

With this construction the measurement — assuming that one switch is actuated by the hours wheel and the other by the seconds wheel of the clockwork — is taken once every day and takes only a brief period of time so that the drain on the battery is insubstantial.

It is preferable that the indicating means be a lag indicator which will remain for approximately a period of twelve hours in the position corresponding to the voltage measured at the time of the preceding measuring incident; according to an additional embodiment of the invention the indicator may be released, through the action of the hours wheel, shortly before each measuring indicent so that it can return to its initial position before it is again deflected during the next-following measuring incident. A scale may be provided which is marked to indicate the level at which the battery must be replaced, and if the indicator does not reach this mark, when the measurement is taken, this is an indication that the battery must be replaced. Conversely, a dial or other component of the timepiece which can be readily observed by the user, may be provided with a cutout and the failure of the indicator to be able to move to a position in which it is visible in the cutout, may then provide an indication that the battery must be replaced.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE is a functional and operational schematic diagram of an embodiment according to the present invention.

DESCRIPTION OF THE PREFERRED EMBODIMENTS

Referring now to the drawing in detail it is pointed out that reference numeral 10 identifies the hours wheel of a timepiece, whereas reference numeral 20 identifies the seconds or minutes wheel of the same timepiece. No attempt has been made to show details concerning the configuration of these wheels, nor of the remainder of the timepiece, because these are not features which are of importance for the purposes of the present invention. It is simply necessary to recall that the wheels 10 and 20 rotate in the direction of the respectively associated arrows and that the hours wheel 10 completes one revolution during a period of 12 hours, whereas if the wheel 20 is the seconds wheel, it will complete one revolution every minute.

A coincidence circuit comprises a switch 12 having two spaced contacts 121 and 122, and a switch 22 having two spaced contacts 221 and 222, with the switches 12 and 22 being connected in series as well as with a measuring device 30 which may be of any known construction and is provided with a lag indicator 31 whose normal or inactive position is identified in chain lines at 33.

The hours wheel 10 is provided with a contact portion 11 which, once every 12 hours, will move into a position with reference to the switch 12 in which it will bridge the contacts 121 and 122 and thus connect the same electrically. A similar contact portion 21 is provided on the wheel 20 and bridges the contacts 221 and 222 of the switch 22 once every minute, that is once during each revolution of the wheel 20.

It will be appreciated that at a predetermined time during each 12-hour interval the contacts 121 and 122 of switch 12 will be bridged by the contact portion 11 whereas at the same time the contacts 221 and 222 of the switch 22 will be bridged by the contact portion 221. When this coincident closing of the switches 12 and 22 occurs, an electrical circuit is completed which connects the battery 40 with the measuring device 30, causing the indicator 31 to move from its position 33 to the full-line position representative of the just-measured voltage of the battery 40. In the illustrated embodiment the dial, housing or the like 34 is provided with a window 32 in which the indicator 31 becomes visible when the level of the voltage measured is above the predetermined replacement level at which the battery must be replaced. If, on the other hand, the battery 40 is discharged to or below the replacement level then the indicator 31 can no longer move from the position 33 far enough to become visible in the window 32, thus indicating that the battery 40 should be replaced.

During the time required for the contact portion 21 on wheel 20 to perform a complete revolution after the measuring incident has been completed, the contact portion 11 on the wheel 10 has moved sufficiently so that it no longer is in electrical contact with both contacts 121 and 122 of the switch 11. The latter is thus now open and when on completing of the next revolution of the wheel 20 the contact portion 21 again bridges the contacts 221 and 222 of the switch 22, failure of coincident closing of the switches 12 and 22 prevents the circuit from becoming completed.

The indicator 31 remains in the full-line position shown, and for this holding means 50 is provided which is diagrammatically illustrated in the drawing and which holds the indicator 31 in the full-line position. Such holding means is disclosed in detail in my aforementioned copending application to which reference may be had. It may be employed in the present invention also and will hold the indicator 31 against return to the broken-line position 33.

During continued rotation of the hours wheel 10 the release means which is here illustrated as cam 13 provided on and turnable with the hours wheel 10, will act upon the holding means 50 in a sense causing it to release the indicator 31 so that the same may return to its rest position 33. The cam 13 may also be so located that it would actually press against the indicator 31 and during continued rotation of the hours wheel 10 will displace the indicator 31 back to its broken-line rest position 33 since the indicator 31 does not normally have a tendency to return to that position, or as a guide against possible jamming of the indicator 31 in full-line position. This release and return of the indicator 31 to the position 33 takes place sometime before the next-following measuring incident and it will be appreciated that the cam 13 is so arranged that when it passes the contacts 121 and 122 of the switch 12 it will not engage them so as to prevent damage to them. The cam 13 can simply be located laterally offset from these contacts.

Once the indicator 31 has been returned by action of the cam 13 to its position 33, continued rotation of the hours wheel 10 will again eventually result in another measuring incident when the contacts of the switches 12 and 22 are bridged in coincidence.

It will be understood that each of the elements described above, or two or more together, may also find a useful application in other types of constructions differing from the types described above.

While the invention has been illustrated and described as embodied in a measuring and indicating arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A measuring and indicating arrangement comprising, in combination, a source of electrical energy of which a parameter is to be measured; measuring means connectable to said source for measuring said parameter; clock means operated by said source and including a clockwork; a first and a second switch actuated by said clockwork at predetermined time intervals in coincidence and completing, when so actuated, an electric circuit connecting said source and said measuring means; and indicating means associated with said measuring means for indicating the measurement taken by the latter.

2. An arrangement as defined in claim 1, wherein said clockwork comprises an hours wheel, a minutes wheel, and a seconds wheel; and wherein one of said switches is actuated by said hours wheel and the other of said switches is actuated by one of the remaining wheels.

3. An arrangement as defined in claim 2; and further comprising holding means for holding said indicating means at the position indicating the measurement taken, after disconnecting of said source from said measuring means by said switches.

4. An arrangement as defined in claim 2, wherein said one remaining wheel is said seconds wheel.

5. An arrangement as defined in claim 2, wherein said one remaining wheel is said minutes wheel.

6. An arrangement as defined in claim 1, wherein said indicating means is a lag indicator.

7. An arrangement as defined in claim 3; and further comprising release means on said hours wheel operative for releasing said holding means for return thereof to its initial position.

8. An arrangement as defined in claim 7, said release means comprising a cam provided on said hours wheel and arranged to engage and act upon said holding means for releasing the same.

9. An arrangement as defined in claim 1, wherein said parameter is the voltage of said source of electrical energy.

10. An arrangement as defined in claim 2, wherein each of said switches comprises two spaced contacts, and wherein each of said hours wheel and said one remaining wheel is provided with an electrically conductive portion positioned for temporary bridging of said contacts of the associated switch in response to rotation of the respective wheel.

* * * * *